United States Patent
Kitamura et al.

(10) Patent No.: US 8,190,941 B2
(45) Date of Patent: May 29, 2012

(54) FIELD CONTROL SYSTEM

(75) Inventors: Satoshi Kitamura, Tokyo (JP); Senji Watanabe, Tokyo (JP); Hideharu Yajima, Tokyo (JP); Masafumi Kisa, Tokyo (JP); Kazushi Sakamoto, Tokyo (JP); Hiroyuki Takizawa, Tokyo (JP); Kuniharu Akabane, Tokyo (JP); Yoshinori Kobayashi, Tokyo (JP); Kenji Habaguchi, Tokyo (JP); Kiyotaka Kozakai, Tokyo (JP); Mitsuhiro Kurono, Tokyo (JP); Hiroaki Nakajima, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 350 days.

(21) Appl. No.: 12/700,196

(22) Filed: Feb. 4, 2010

(65) Prior Publication Data

US 2010/0199003 A1  Aug. 5, 2010

(30) Foreign Application Priority Data

Feb. 5, 2009  (JP) .................................. 2009-025107

(51) Int. Cl.
  *G06F 1/14*  (2006.01)
(52) U.S. Cl. .................... 713/375; 713/400; 713/502
(58) Field of Classification Search .................. 713/375, 713/400, 401, 500, 502
See application file for complete search history.

(56) References Cited

U.S. PATENT DOCUMENTS

| 4,890,222 | A | * | 12/1989 | Kirk | ............................... | 713/400 |
| 6,535,926 | B1 | * | 3/2003 | Esker | ............................. | 709/248 |
| 2007/0209445 | A1 | * | 9/2007 | Bohr et al. | ....................... | 73/774 |

FOREIGN PATENT DOCUMENTS

| JP | 2004-272403 A | 9/2004 |
| JP | 2006-276958 A | 10/2006 |

OTHER PUBLICATIONS

Japanese Office Action dated Jan. 31, 2011, issued in corresponding Japanerse Patent Application No. 2009-025107.

* cited by examiner

*Primary Examiner* — Dennis M Butler
(74) *Attorney, Agent, or Firm* — Westerman, Hattori, Daniels & Adrian, LLP (57) ABSTRACT

The field control system includes: a field device; a field controller which is connected to a control network and which executes a computation processing for controlling the field device according to a given control cycle while executing a data communication between the field controller and the field device, the field controller including a communication unit configured to execute the data communication with the field device, and a control computation unit configured to execute the computation processing independently from the communication unit; and an operation monitor which is connected to the control network and which operates and monitors the field device, the operation monitor including a network clock which provides a common network time to the control network. The control computation unit and the communication unit execute the computation processing and the data communication in synchronism with each other in accordance with a timer clock based on the network time.

5 Claims, 9 Drawing Sheets

FIELD CONTROL SYSTEM

This application claims priority from Japanese Patent Application No. 2009-025107, filed on Feb. 5, 2009, the entire contents of which are incorporated by reference herein.

BACKGROUND OF THE INVENTION

1. Technical Field

The present disclosure relates to a field control system. More particularly, the present disclosure relates to a filed control system that includes a field controller connected to a control network and executes computation processing for controlling a field device according to a given control cycle while executing a data communication between the field controller and the field device.

2. Related Art

In the field control system, a field device is connected to a field controller through an input and output module, and the field controller repeatedly executes computation processing necessary for field control while executing data input and output processing with the field device according to a given control cycle. This computation processing is performed using the input data obtained from the field device, and the result of the computation processing is reflected in the output data to the field device (see e.g., JP-A-2006-276958).

However, in the case where the computation processing and the data input and output processing are executed by one processor, the processing of the processor is monopolized during the data input and output processing with the field device and this reduces the overall performance of the system.

On the other hand, it is considered to use a dedicated coprocessor for the data input and output processing with the field device. In this case, the coprocessor can perform the processing of data from the field device at all times independently of the processing of the processor. When receiving a data output request from the processor, the coprocessor suspends the data input processing and executes data output. By such a processing procedure, the processing amount of the processor is significantly reduced, whereby the overall performance of the system can be improved.

However, since the processor cannot control the timing of the data input processing, the data input timing varies. Thus, there may be a problem in that the processor obtains old data.

Moreover, when communication is performed between a plurality of field controllers connected to the control network, if the timing of the data input processing or the like differs among the field controllers, problems arise in that the accuracy and stability of control are reduced.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a field control system capable of appropriately controlling the timing of data communication with the field device.

According to one or more illustrative aspects of the present invention, there is provided a field control system. The field control system comprises: a field device; at least one field controller which is connected to a control network and which executes a computation processing for controlling the field device according to a given control cycle while executing a data communication between the field controller and the field device, the field controller comprising: a communication unit configured to execute the data communication with the field device; and a control computation unit configured to execute the computation processing independently from the communication unit; and an operation monitor which is connected to the control network and which operates and monitors the field device, the operation monitor comprising: a network clock which provides a common network time to the control network, wherein the control computation unit and the communication unit execute the computation processing and the data communication in synchronism with each other in accordance with a timer clock based on the network time.

According to the field control system of the present invention, since the computation processing for controlling the field device and the data communication with the field device are executed in synchronism with each other with timing conforming to the timer clock based on the network time, the timing of the data communication with the field device can be appropriately controlled.

Other aspects of the invention will be apparent from the following description, the drawings and the claims.

DETAILED DESCRIPTION OF EXEMPLARY EMBODIMENTS

Hereinafter, exemplary embodiments of the field control system according to the present invention will be now described with reference to the drawings.

Figure 1:
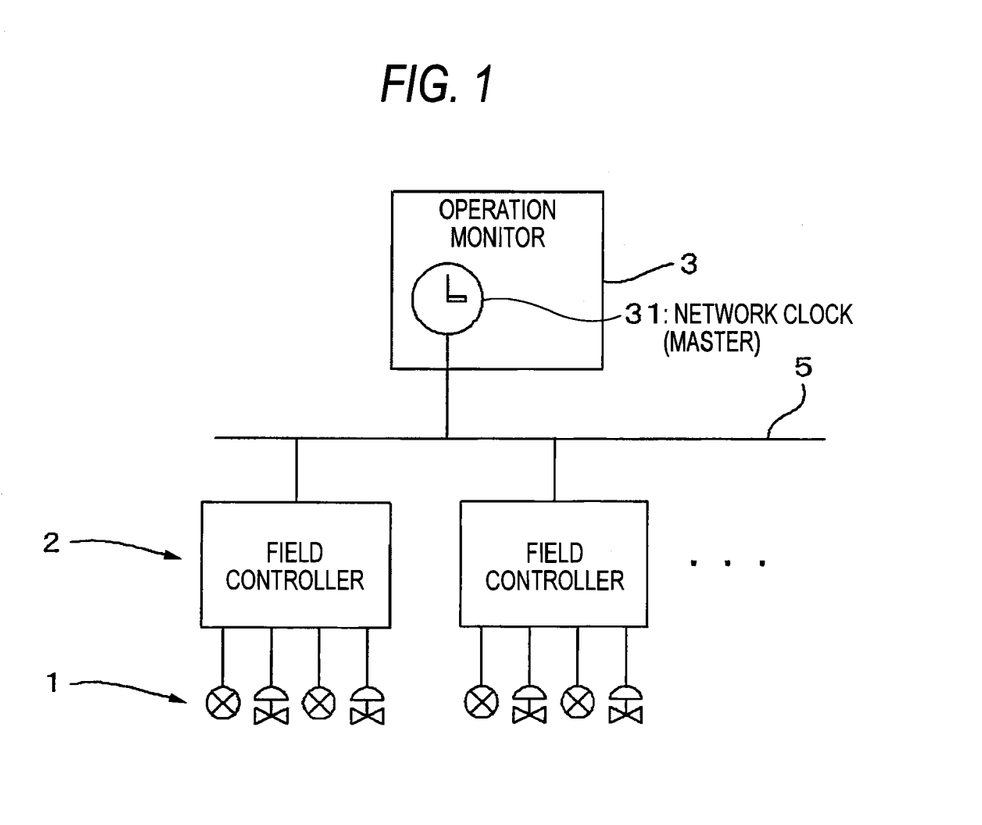
FIG. 1 is a block diagram showing the configuration of a distributed control system as the field control system according to a first embodiment of the invention.
Figure 2:
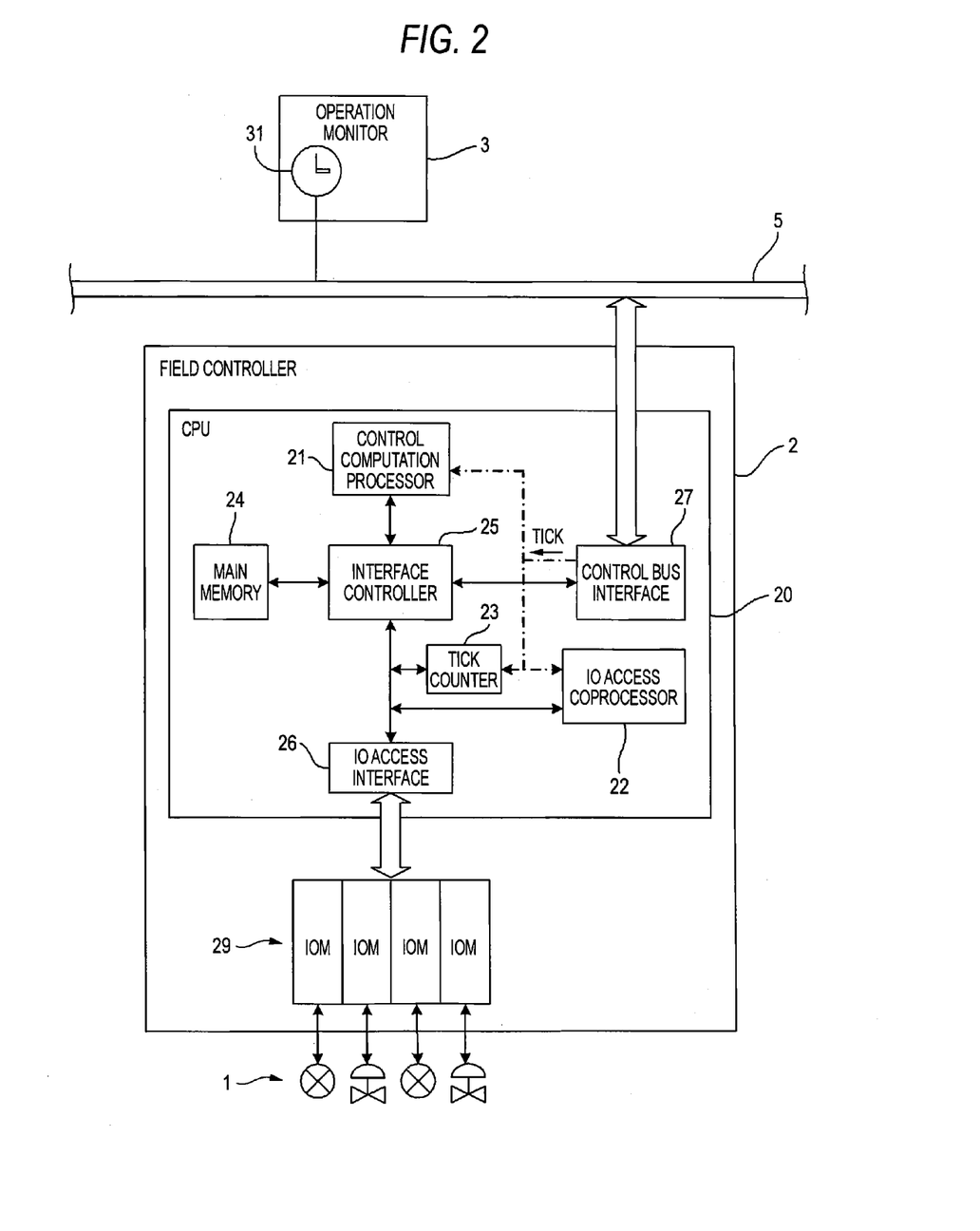
FIG. 2 is a block diagram functionally showing the configuration of the field controller shown in FIG. 1.

FIG. 1 is a block diagram showing the configuration of a distributed control system as the field control system of a first embodiment of the invention. FIG. 2 is a block diagram functionally showing the configuration of a field controller.

As shown in FIG. 1, the distributed control system includes: field controllers 2 disposed in a plant in a distributed manner; and an operation monitor 3 for operating and monitoring a field device group 1 in the plant through the field controllers 2. The field controllers 2 and the operation monitor 3 are connected to each other via a control network 5.

The operation monitor 3 is provided with a network clock 31 that defines the network time of the control network 5. All the devices connected to the control network 5 execute control processing according to a timer clock (TICK) with reference to the network time defined by the network clock 31, and the control operations of the field controllers 2 are synchronized with one another. The field controllers 2 perform communication through the control network 5 with one another according to the timer clock.

As shown in FIG. 2, the field controller includes: a CPU 20 that executes computation processing for controlling the field device group 1 according to a given control cycle; and an input and output module (IO module) group 29 that executes data input and output with the field device group 1.

As shown in FIG. 2, the CPU 20 includes: a control computation processor 21 that executes computation processing for controlling the field device group 1; an IO access coprocessor 22 capable of executing communication processing with the field device group 1 through the input and output module group 29 at all times; and a TICK counter 23 that counts the timer clock (TICK). The CPU 20 further includes a main memory 24, an interface controller 25, an IO access interface 26 and a control bus interface 27.

Next, the operation of the field controller 2 will be now described.

Figure 3:
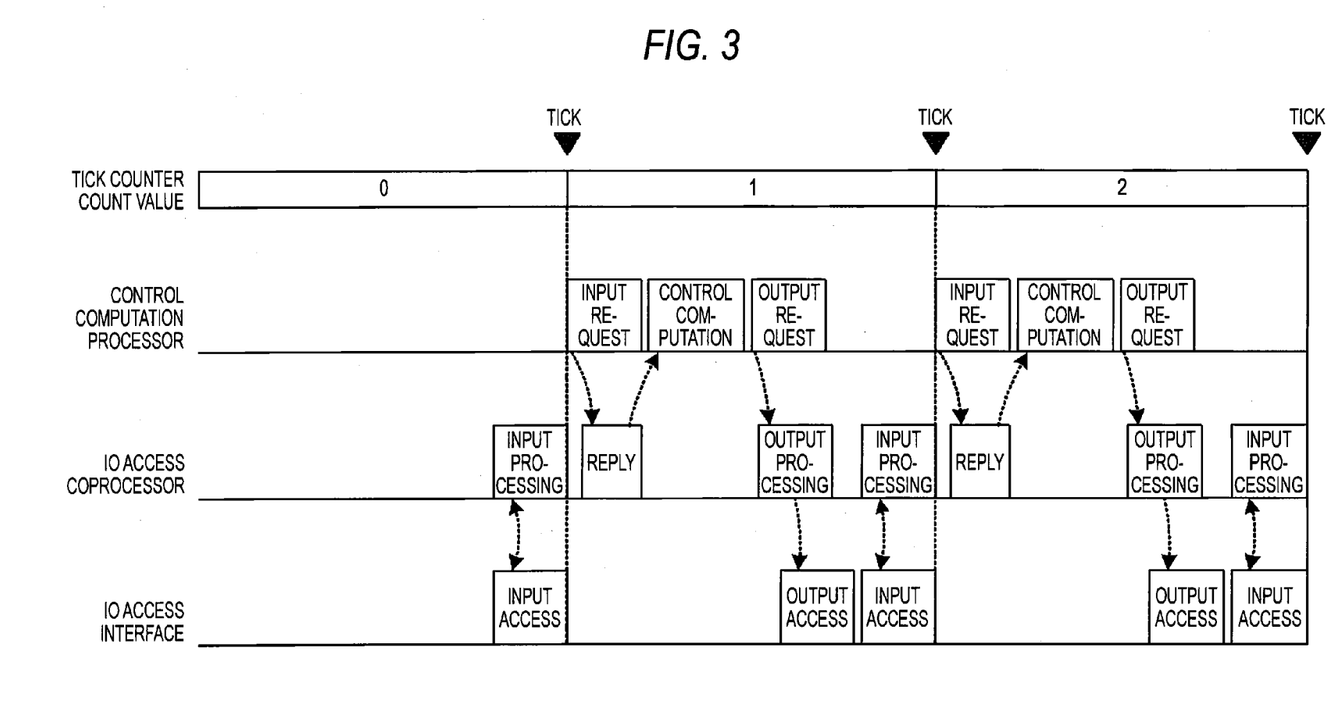
FIG. 3 is a timing chart showing the operation of the field controller.

FIG. 3 is a timing chart showing the operation of the field controller 2.

The timer clock (TICK) of the field controller 2 is generated based on the network time obtained from the control network 5 through the control bus interface 27, and is supplied to the control computation processor 21, the IO access coprocessor 22 and the TICK counter 23.

The IO access coprocessor 22, which is provided separately from the control computation processor 21, is capable of executing data input and output processing with the field device group 1 with respect to the IO access interface 26 at all times.

As shown in FIG. 3, the control computation processor 21 sends an input request to the IO access coprocessor 22 through the interface controller 25 with the timer clock (TICK) as a trigger of a fixed-cycle interruption. After receiving the input request, the IO access coprocessor 22 returns the requested input data among the already-collected input data, to the control computation processor 21. The control computation processor 21 executes a control computation based on the input data, and requests the IO access coprocessor 22 to output the result of the computation.

Upon receiving the output request, the IO access coprocessor 22 performs output processing to the corresponding input and output module through the IO access interface 26.

As described above, in the field control system of the present embodiment, the CPU 20 includes the TICK counter 23, and thus the control computation processor 21 and the IO access coprocessor 22 can both access the TICK counter 23.

The IO access coprocessor 22 can find the operation timing of the system since the timer clock (TICK) is inputted to the IO access coprocessor 22. However, normally, the IO access coprocessor 22 cannot determine the ordinal position, in the control cycle, of the interruption to which the timer clock (TICK) corresponds. For example, one hundred interruptions may mean one control cycle, and in such cases, the IO access coprocessor 22 cannot recognize where in the control cycle the operation is currently performed.

However, in the field control system of the present embodiment, the IO access coprocessor 22 can recognize the timing in the control cycle by accessing the TICK counter 23.

The control computation processor 21 writes the initial value to the TICK counter 23, for example, at the start of the control cycle. Thereafter, since the TICK counter 23 counts up by receiving the timer clock (TICK), the IO access coprocessor 22 can recognize the timing in the control cycle by reading the count value of the TICK counter 23. For this reason, the IO access coprocessor 22 can recognize the contents of the processing to be executed at the present moment.

For example, when the IO access coprocessor 22 previously recognizes that the control computation processor 21 makes an input request regarding given input data at the next timer clock (TICK), the IO access coprocessor 22 can execute input processing on the IO access interface 26 immediately before receiving the timer clock (TICK) and also can prepare the given input data in advance. Consequently, the IO access coprocessor 22 can quickly return the prepared input data in response to the input request from the control computation processor 21.

Likewise, when an output request from the control computation processor 21 can be predicted, the IO access coprocessor 22 can quickly execute output processing in response to the output request by suspending another processing.

As described above, in the control system of the present embodiment, since the IO access coprocessor 22 is provided separately from the control computation processor 21, the control computation processor 21 is released from data input and output processing. Consequently, the load on the control computation processor 21 can be reduced, and thus the control computation can be efficiently executed.

Moreover, in the control system of the present embodiment, since the IO access coprocessor 22 can recognize the timing in the control cycle, the operations of the control computation processor 21 and the IO access coprocessor 22 can be synchronized with each other and the time jitter of operations necessary for control can be reduced, so that the overall control accuracy of the system can be improved.

Figure 4:
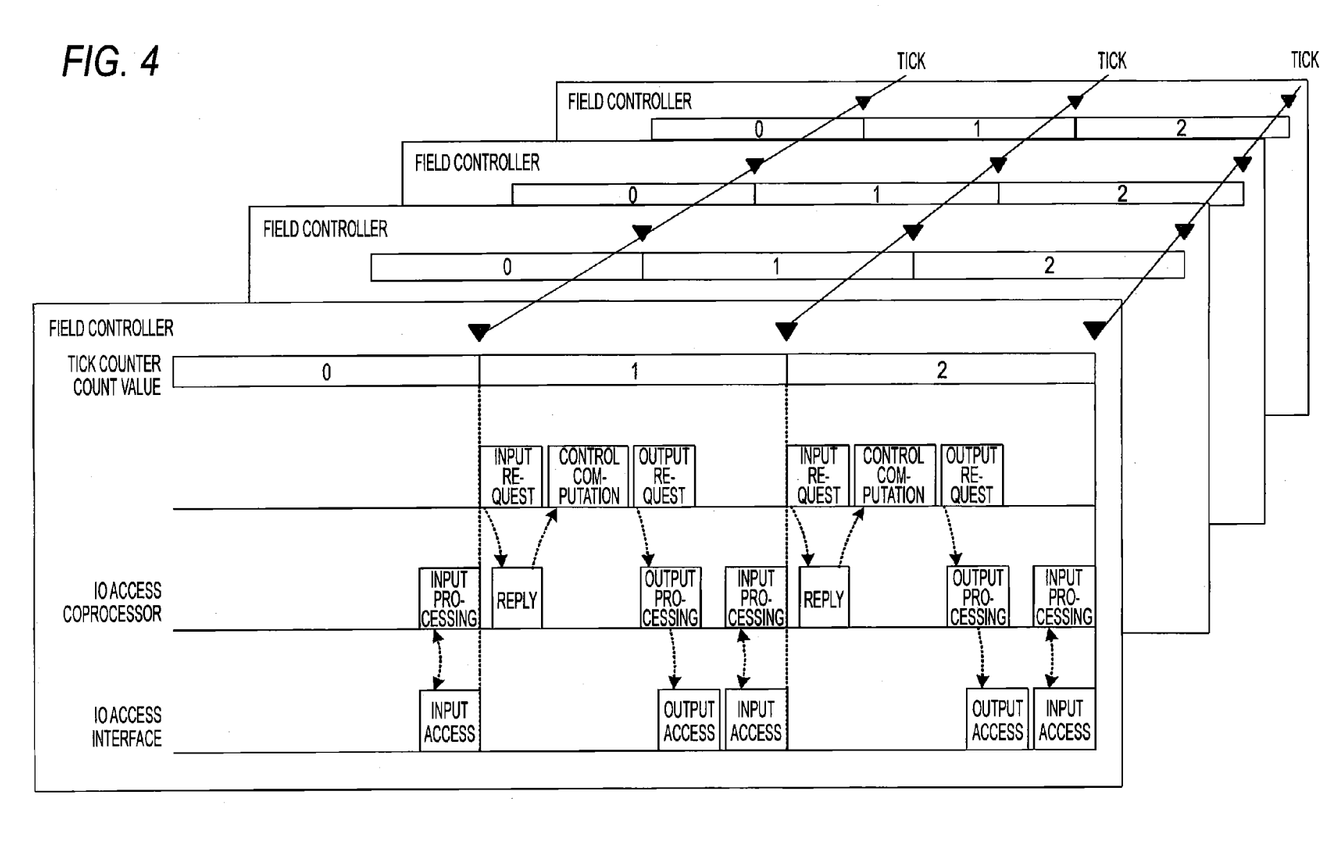
FIG. 4 is a view showing a state where the operations of the field controllers connected to one another via a control network are synchronized with one another.

FIG. 4 is a view showing a state where the operations of the field controllers 2 which are connected to one another through the control network 5 are synchronized with one another. As described above, since the field controllers 2 operate at the timing according to the timer clock (TICK) with reference to the network time defined by the network clock 31, the timing of the operation including data input and output to the field device group 1 can be accurately synchronized in the entire system. Consequently, no variations occur in the timing of input and output processing, and input and output processing can be performed at stable timing.

Moreover, for the data exchanged among the field controllers 2, the input data collection time can be made the same among the field controllers 2, so that the accuracy of control can be improved. Further, input and output data at the same time can also be obtained, for example, when the operation monitor 3 obtains input and output data for the field device group 1 by way of the field controllers 2. Moreover, by giving a specification of the collection time to the field controllers 2, it is possible to obtain the input and output data at the specified time.

Since the field controllers 2 share the network time, the timing of communication among the field controllers 2 connected to the control network 5 can be distributed based on the network time. Thereby, the communication load on the control network 5 can be adjusted.

Figure 5:
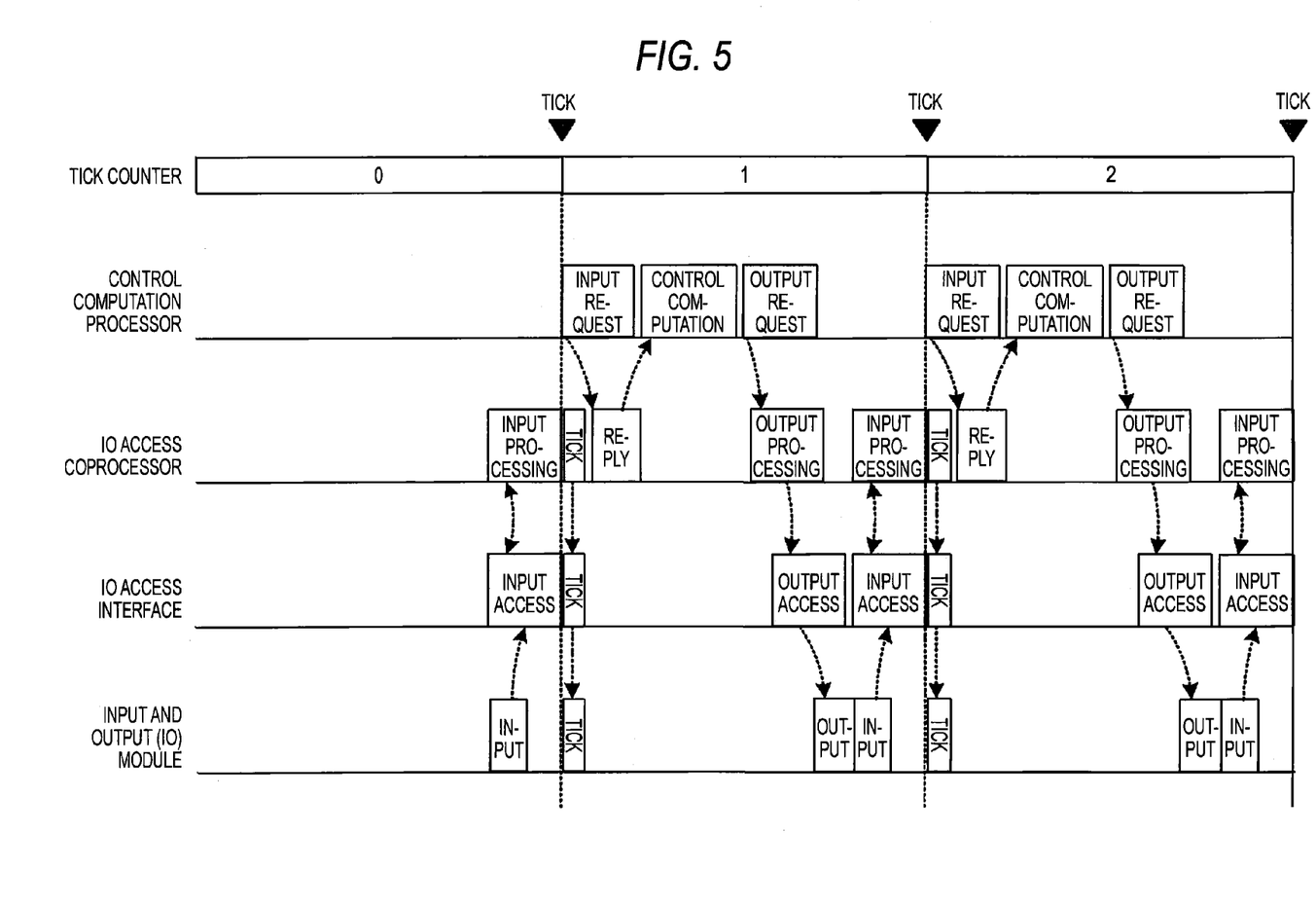
FIG. 5 is a timing chart showing an operation example where an input and output module is operated in synchronism with the system.

By supplying the timer clock (TICK) to the input and output module (IO module) and providing the counter that counts the timer clock (TICK), the input and output module itself can operate in synchronism with the system. In this case, like the IO access coprocessor 22, the input and output module itself can recognize the timing of its own execution of input and output processing. Consequently, the time variations of the input and output processing of the input and output module are eliminated, so that the overall time synchronization accuracy of the system can be further improved.

FIG. 5 is a timing chart showing an operation example of this case.

As shown in FIG. 5, the timer clock (TICK) generated according to the network time is supplied from the IO access coprocessor 22 to the input and output module 29 through the IO access interface 26 and the timer clock (TICK) is counted by the counter of the input and output module 29, whereby the input and output module 29 can recognize the timing in the control cycle. At the start of the control cycle, by providing a notification thereof, the initial value of the counter can be set.

With this configuration, the input and output module 29 can grasp the schedule of input and output processing in advance. Therefore, it is enabled to execute only necessary input and output processing prior to the request from the control computation processor 21. Consequently, the overall performance of the system is improved.

Figure 6:
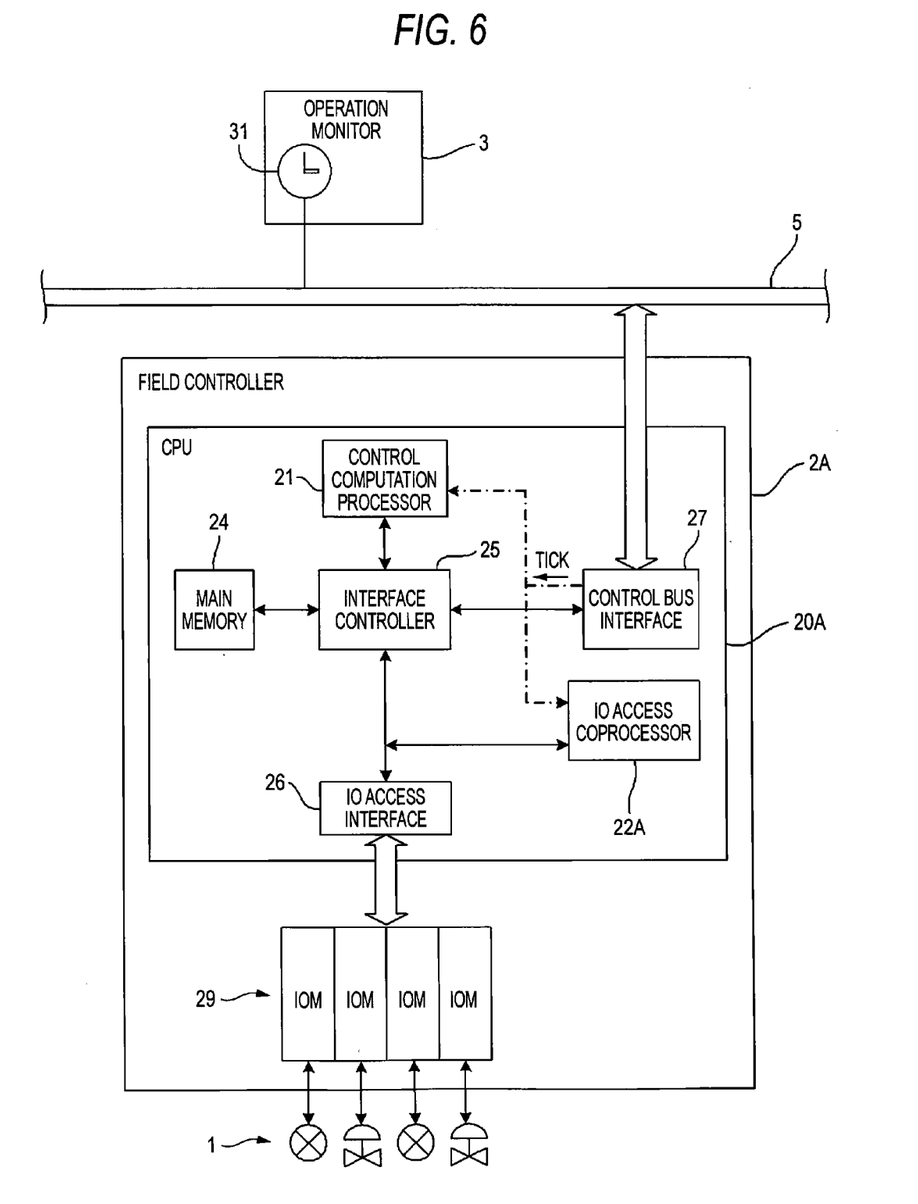
FIG. 6 is a block diagram showing the configuration of a distributed control system as a field control system according to a second embodiment of the invention.
Figure 7:
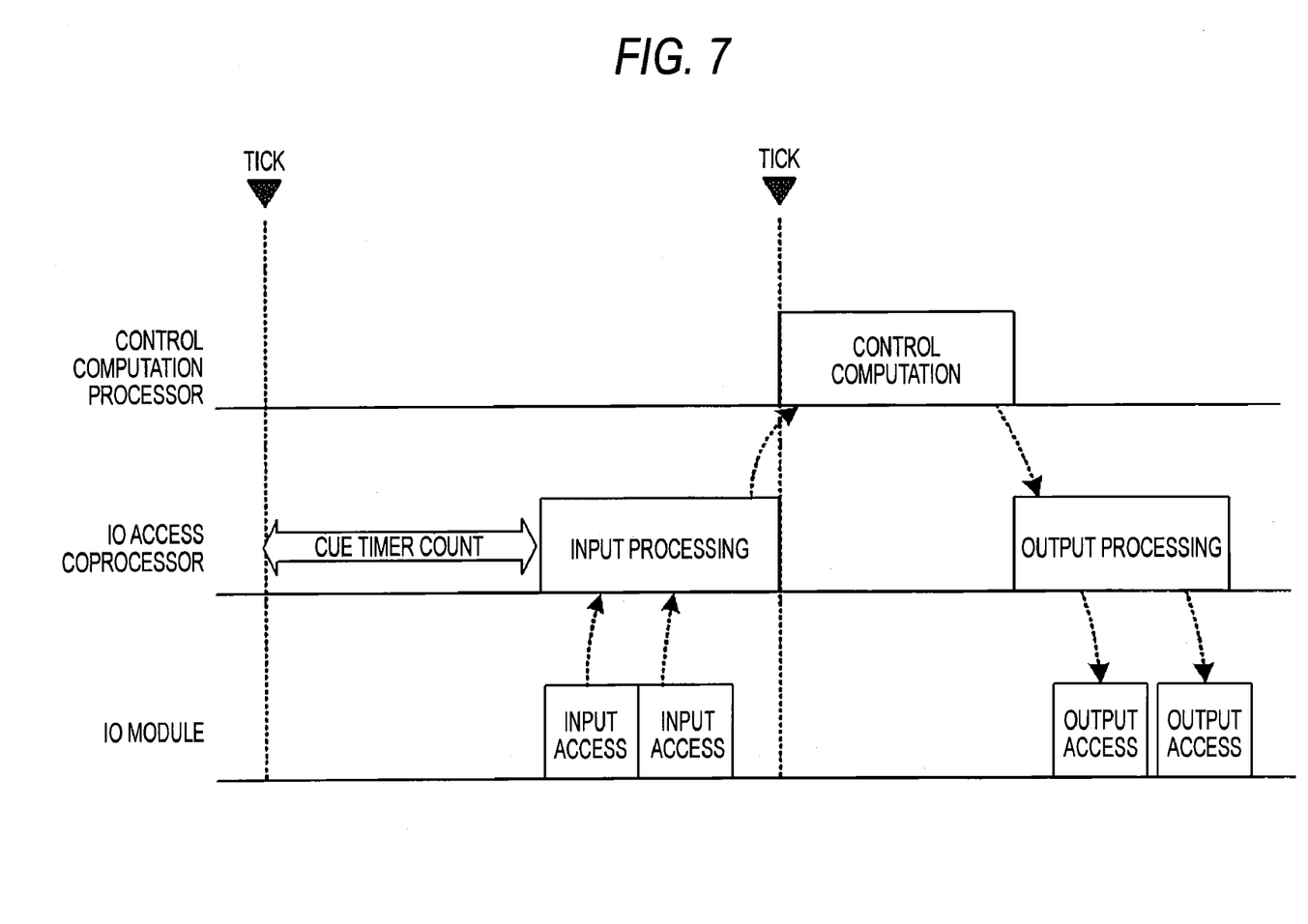
FIG. 7 is a timing chart showing the operation of the field control system.

FIG. 6 is a block diagram showing the configuration of a distributed control system as the field control system according to a second embodiment of the invention. FIG. 7 is a timing chart showing the operation of the field control system of the present embodiment. In FIG. 6, the same elements as those of the field control system of the first embodiment are denoted by the same reference numerals.

As shown in FIG. 6, in the field control system of the present embodiment, a field controller 2A is used instead of the field controller 2 in the field control system of the first embodiment. A CPU 20A of the field controller 2A includes an IO access coprocessor 22A, and the IO access coprocessor 22A has the function of a cue timer for determining the timing of input and output processing. On the other hand, in the CPU 20A, the function corresponding to the TICK counter 23 (FIG. 2) is omitted.

As shown in FIG. 7, in the field control system of the present embodiment, when receiving the timer clock (TICK), the IO access coprocessor 22A sets, as the timeout value of the cue timer, the time to the actual start of input processing, and starts time counting. As shown in FIG. 7, the IO access coprocessor 22A starts the input processing of the IO access interface 26 by the timeout of the cue timer, and data of the field device are inputted through the corresponding input and output module 29.

As shown in FIG. 7, the timeout value of the cue timer is set so that the input processing by the IO access coprocessor 22A is completed immediately before control computation processing is started by the control computation processor 21. After the input processing is completed by the IO access coprocessor 22A, the control computation processor 21 starts control computation using the input data inputted from the IO access coprocessor 22A at the timer clock (TICK).

As described above, in the field control system of the present embodiment, the input processing by the IO access coprocessor 22A is executed after a given time has elapsed from the timer clock (TICK) using the cue timer. Thereby, the control computation and the data input and output processing can be synchronized with each other.

Moreover, for data communication among the field controllers 2A, the times of the input and output data can be made the same as in the first embodiment, so that stable control can be performed in the entire system.

Figure 8:
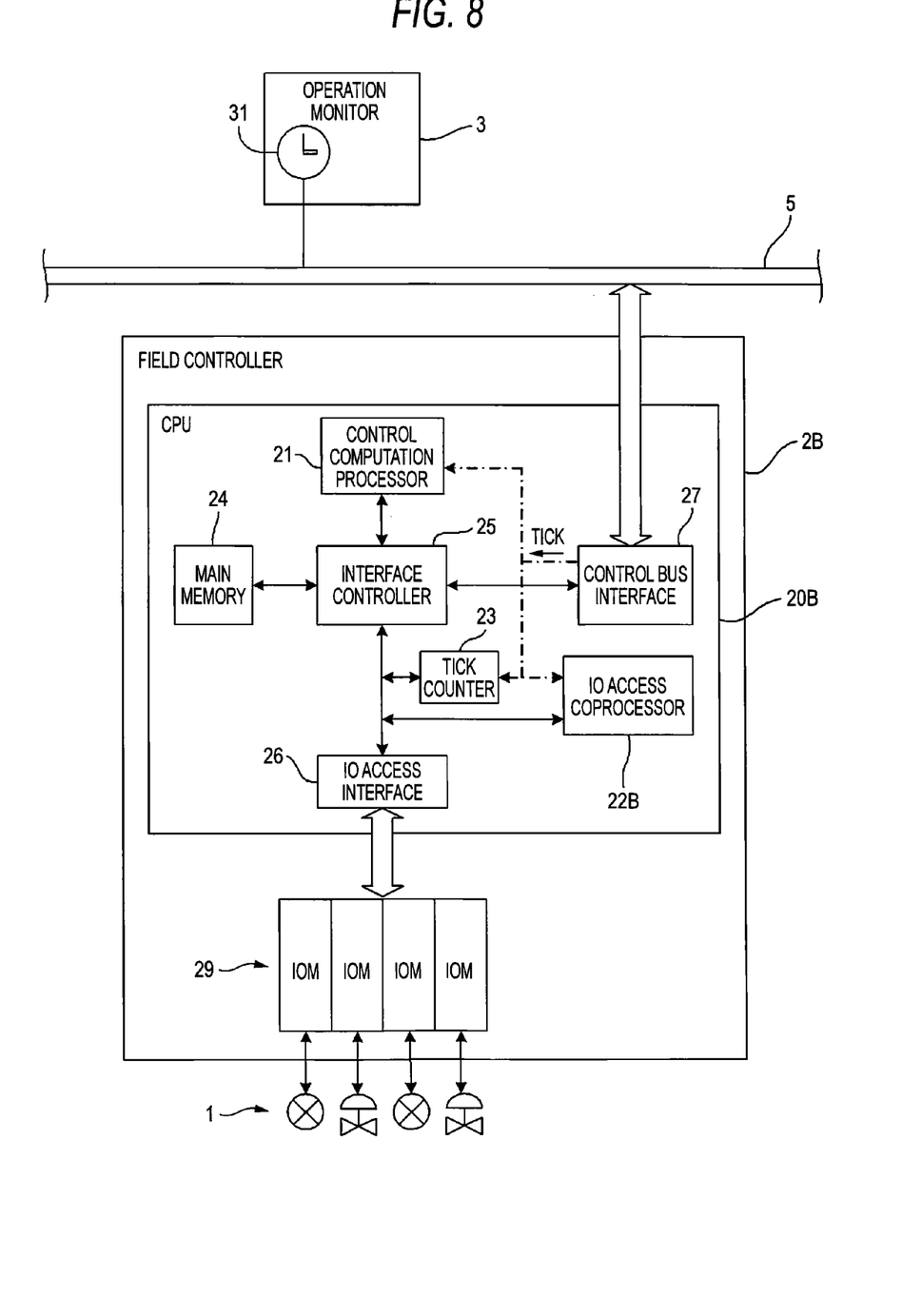
FIG. 8 is a block diagram showing the configuration of a distributed control system as a field control system of a third embodiment of the invention.
Figure 9:
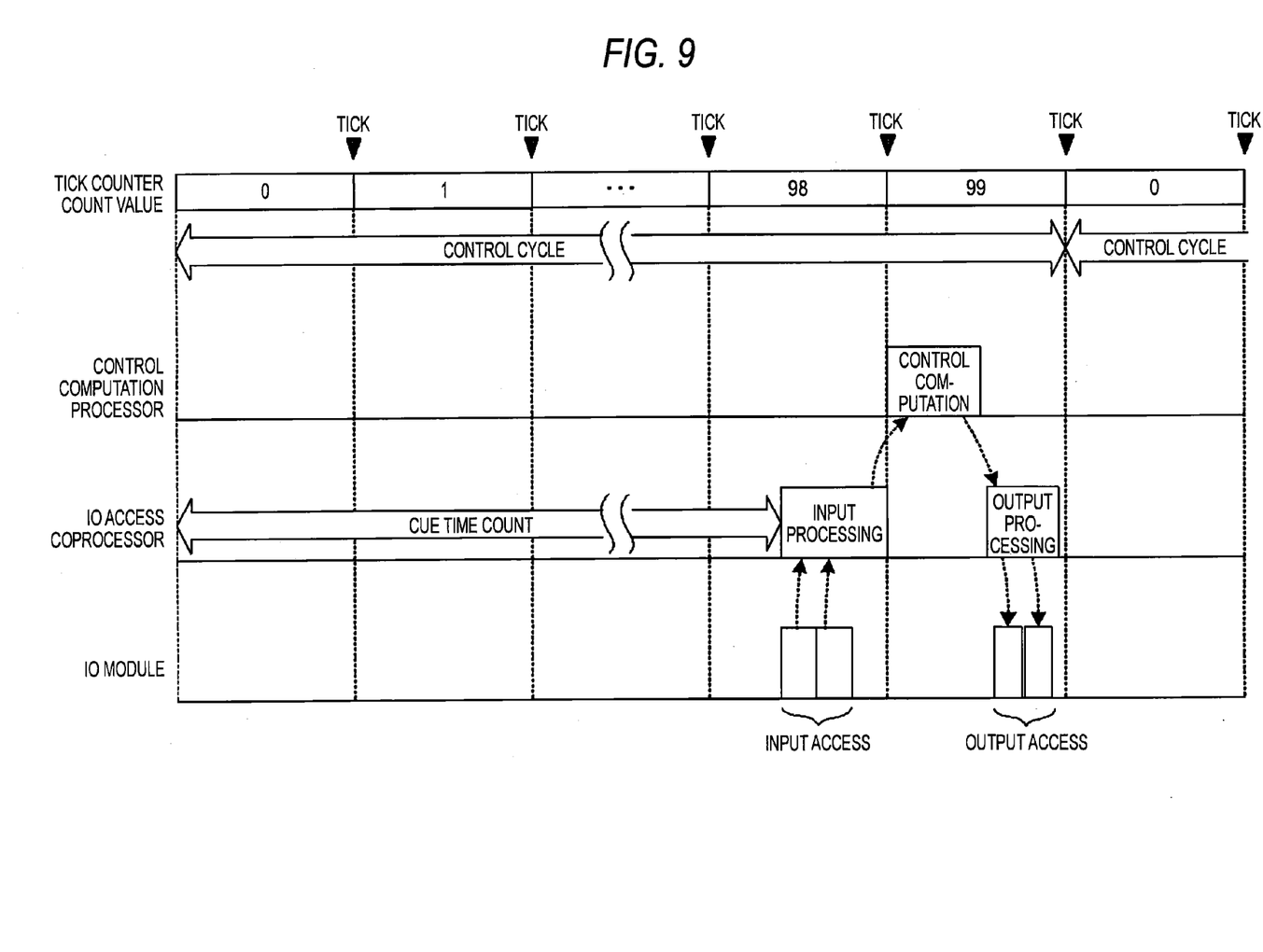
FIG. 9 is a timing chart showing the operation of the field control system.

FIG. 8 is a block diagram showing the configuration of a distributed control system as the field control system according to a third embodiment of the invention. FIG. 9 is a timing chart showing the operation of the field control system of the present embodiment. In FIG. 8, the same elements as those of the field control system of the first embodiment are denoted by the same reference numerals.

As shown in FIG. 8, in the field control system of the present embodiment, a field controller 2B is used instead of the field controller 2 of the field control system of the first embodiment. A CPU 20B of the field controller 2B includes an IO access coprocessor 22B, and the IO access coprocessor 22B has the function of a cue timer for determining the timing of input and output processing.

As shown in FIG. 9, in the field control system of the present embodiment, the control cycle corresponds to one hundred cycles of the timer clock TICK. The count value of the TICK counter 23 is reset to 0 by the clock timer (TICK) at the start of the control cycle.

Moreover, in the field control system of the present embodiment, when receiving the timer clock (TICK) at the start of the control cycle, the IO access coprocessor 22B sets, as the timeout value of the cue timer, the time to the actual start of input processing, and starts time counting. As shown in FIG. 9, the IO access coprocessor 22B starts the input processing of the IO access interface 26 by the timeout of the cue timer, and data of the field device are inputted through the corresponding input and output module 29.

As shown in FIG. 9, the timeout value of the cue timer is set so that the input processing by the IO access coprocessor 22B is completed immediately before control computation processing is started by the control computation processor 21. After the input processing is completed by the IO access coprocessor 22B, the control computation processor 21 starts control computation using the input data inputted from the IO access coprocessor 22B at the next timer clock (the count value=99 of the TICK counter 23).

Then, the IO access coprocessor 22B executes the output processing of the output data obtained by the control computation of the control computation processor 21, and completes the output processing before the next timer clock (the count value=0 of the TICK counter 23). With this method, data input and output can be periodically executed with fixed timing in the last stage of the control cycle.

As described above, in the field control system of the present embodiment, the operations of the control computation processor 21 and the IO access coprocessor 22B are controlled using the count value of the TICK counter 23. Moreover, the input processing by the IO access coprocessor 22B is executed after a given time has elapsed from the timer clock (TICK) using the cue timer. With the timing control of these methods, the data input and output processing by the IO access coprocessor 22B can be executed in synchronism with control computation during a given period in the control cycle.

For data communication among the field controllers 2B, the times of the input and output data can be made the same as in the first embodiment, so that stable control can be performed in the entire system.

As described above, according to the field control system of the present invention, since the computation processing for controlling the field device and the data communication with the field device are executed in synchronism with each other according to the timer clock based on the network time, the timing of data communication with the field device can be appropriately controlled.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A field control system comprising:
   a field device;
   at least one field controller which is connected to a control network and which executes a computation processing for controlling the field device according to a given control cycle while executing a data communication between the field controller and the field device, the at least one field controller comprising:
      a communication unit configured to execute the data communication with the field device; and
      a control computation unit configured to execute the computation processing independently from the communication unit; and
   an operation monitor which is connected to the control network and which operates and monitors the field device, the operation monitor comprising:
      a network clock which provides a common network time to the control network,
   wherein the control computation unit and the communication unit execute the computation processing and the data communication in synchronism with each other in accordance with a timer clock based on the network time.

2. The field control system according to claim 1, wherein the field controller further comprises:
   a count unit configured to count the timer clock, wherein a timing of the data communication depends on a counting condition of the count unit.

3. The field control system according to claim 2, wherein the given control cycle corresponds to a plurality of cycles of the timer clock, and a count value of the count unit is reset every the given control cycle.

4. The field control system according to claim 1, wherein the communication unit executes the data communication after a given time has elapsed from the timer clock.

5. The field control system according to claim 1, wherein said at least one field controller comprises a plurality of field controllers, and the field controllers perform communication through the control network with each other in accordance with the timer clock.

* * * * *